United States Patent [19]

Walba

[11] Patent Number: 5,168,381
[45] Date of Patent: Dec. 1, 1992

[54] SMECTIC LIQUID CRYSTAL DEVICES USING SSFLC AND ELECTROCLINIC EFFECT BASED CELLS

[75] Inventor: David M. Walba, Boulder, Colo.

[73] Assignee: University Research Corporation, Boulder, Colo.

[21] Appl. No.: 634,417

[22] Filed: Dec. 27, 1990

Related U.S. Application Data

[63] Continuation-in-part of Ser. No. 429,304, Oct. 30, 1989, abandoned.

[51] Int. Cl.$^5$ .............................................. G02F 1/13
[52] U.S. Cl. ........................................ 359/53; 359/63; 359/94; 359/100
[58] Field of Search ................. 350/350 S, 340, 334, 350/337, 347 R, 335; 359/63, 39, 53, 84, 93, 94, 99, 100

[56] References Cited

U.S. PATENT DOCUMENTS

| | | | |
|---|---|---|---|
| 4,367,924 | 1/1983 | Clark et al. | 350/334 |
| 4,563,059 | 1/1986 | Clark et al. | 350/334 X |
| 4,838,663 | 6/1989 | Lagerwall et al. | 350/350 S |
| 4,879,144 | 11/1989 | Nakura et al. | 350/350 S X |
| 5,035,491 | 7/1991 | Kawagishi et al. | 350/350 S |

FOREIGN PATENT DOCUMENTS

WO87/06021 10/1987 European Pat. Off.
0040816 2/1989 Japan .................................. 350/337

OTHER PUBLICATIONS

Handschy et al., "Polarization-based optical parallel logic gate using FLCs", Optics lett., vol. 12, No. 8, Aug. 1987, pp. 611-613 (no date).

Primary Examiner—Stanley D. Miller
Assistant Examiner—Huy K. Mai
Attorney, Agent, or Firm—Greenlee & Winner

[57] ABSTRACT

Fast switching, high-contrast light valves and light valves which function for multi-level, gray-scale production are provided. Light valves of this invention employ two or more low-tilt, chiral smectic liquid crystal cells which are half-wave plates. Bistable FLC cells or FLC cells having smectic A* materials which display a field dependent tilt angle can be used. The FLC cells of exemplary device configurations are positioned sequentially along a light path through the device with the optic axes of the sequential FLC cells rotating in opposite directions upon application of a driving electric field thereacross. Light valves employing smectic C* and smectic A* liquid crystal cells are provided.

19 Claims, 2 Drawing Sheets

SMECTIC LIQUID CRYSTAL DEVICES USING SSFLC AND ELECTROCLINIC EFFECT BASED CELLS

This application is a continuation-in-part of U.S. application Ser. No. 429,304, filed Oct. 30, 1989, now abandoned.

FIELD OF THE INVENTION

The present invention relates generally to smectic liquid crystal devices, particularly to those based on chiral smectic liquid crystals. More specifically, the invention relates to device configurations which incorporate two or more chiral smectic liquid crystal cells to obtain fast-switching, high-contrast light valves and multistable gray scale light valves.

BACKGROUND OF THE INVENTION

The surface stabilized ferroelectric liquid crystal (SSFLC) light valve has been shown to possess properties useful in a number of electro-optic device applications requiring high contrast ratio. These include electro-optic shutters, spatial light modulators for optoelectronic computing, and flat panel display devices. The physics and operation of the surface stabilized FLC has been extensively described elsewhere (Clark, N. A. et al. (1983) Mol. Cryst. Liq. Cryst. 94:213). U.S. Pat. Nos. 4,367,924 and 4,563,059 of Clark and Lagerwall describe SSFLC cells. In such FLC cells, an appropriate FLC material is incorporated between glass plates, the inner surfaces of which are coated with a transparent electrode. Application of an electric field to the electrode induces a switching or rotation of the molecular orientation of the FLC materials in the cell. The application of the electric field, thus, switches between two orientations of the optic axis of the cell each of which represents a different transmission state of the cell. The speed of response (switching speed) is often important. This response speed is given approximately by equation 1:

$$\tau = \frac{\eta}{PE} \quad (1)$$

where $\tau$ is the optical response (10%-90%) to an applied voltage step of magnitude E, $\eta$ is the orientational viscosity, and P is the ferroelectric polarization density. In the surface stabilized state, FLC molecules lie in smectic layers perpendicular to the glass plates (the so-called bookshelf geometry). The FLC optic axis makes an angle $\pm\Theta$ with respect to the layer normal. Application of an electric field across the glass plates of the cell allows the optic axis of the cell to be rotated through $2\Theta$. The tilt angle is an intrinsic property of the FLC material. SSFLC cells have for the most part been demonstrated with smectic C* materials. However, any chiral tilted smectic LC materials are useful. The voltage requirements for SSFLC switching devices are modest ($\pm10$ V), and power consumption is quite low because the FLC switching energy is small. An additional advantage for some applications is that the devices are bistable (Clark, N. A. and Lagerwall, S.T. (1980) Appl. Phys. Lett. 36:899), allowing relatively easy implementation of passive matrix addressing in 1D and 2D arrays.

The contrast (ratio of transmitted light intensity through the cell in the bright and dark states) in a standard SSFLC cell is greatest when the tilt angle $\Theta$ of the FLC material is 22.5°. Under these conditions, at the half wave thickness (where $d=\lambda/2 \Delta n$) between crossed polarizers (an entrance polarizer and an exit polarizer or analyzer), the dark state will leave the plane of polarization of the input light unchanged, while the bright state will rotate the plane of polarization of the input light through 90°(4$\Theta$). In general, in the on (switched) state the plane of polarization of the input light will be rotated through 4$\Theta$, where $\Theta$ is the tilt angle.

The orientation viscosity, $\eta$, generally increases with increasing tilt angle. Often, $\eta$ increases with tilt angle faster than P, and thus materials with low tilt angle (i.e. $\Theta<15°$) often show improved electro-optic response speed relative to similar materials with 22.5° tilt. However this increase in speed is achieved only at the expense of contrast, since the output light in the SSFLC is then rotated through $<90°$, and when crossed polarizers are employed a significant amount of the light in the on state is extinguished at the analyzer.

Sub-millisecond switching times can be achieved at room temperature with SSFLC cells. These switching devices are not hampered by small entrance apertures, as FLC cells can be fabricated on large substrates. In fact, current applications of FLC's include flat panel displays (Inove, H. et al., Int. Display Conference, Oct. 4-6, 1988).

An electroclinic effect has been described with chiral smectic liquid crystal materials (Garoff and Meyer (1977) Phys. L. Rev. Lett. 38:848 and (1979) Phys. Rev. A 19:338). Light valves based upon this electroclinic effect have been described. For example, Andersson et al. (1987) Appl. Phys. Lett. 51:640 described a "soft-mode" switching effect and soft mode cells, incorporating smectic A* LCs, having the same bookshelf geometry as described for SSFLC cells. The rotation of the optic axis of these cells is dependent on the strength of the applied field. Electroclinic effect based cells have been demonstrated for chiral smectic A*LC materials. These cells exhibit several attractive features, including fast response and voltage regulated true analog response, affording, e.g. true analog gray scale intensity modulation. However, for all materials known, the maximum tilt angle achieved due to the electroclinic effect is small (i.e. $\Theta<15°$), and the maximum contrast ratio that can be achieved in such devices is low for the same reason as for low-tilt SSFLC cells. Similar to smectic C*LC devices, when the field induced tilt angle is large, switching speeds are relatively slow, while low-tilt materials give, in general, faster switching speeds. Thus, in the smectic A*LC devices the same speed for contrast tradeoff is generally required as for smectic C* devices. Electroclinic effect based cells have many of the characteristics of SSFLC cells.

Thus, there are two important light-modulation technologies involving chiral smectic liquid crystals (S*LCs). These are the smectic C*LC based SSFLC light valves, and the smectic A*LC based electroclinic light valves. Some illustrative applications of devices based upon these technologies are as follows. *Smectic C*LC applications:* Single element modulators with large aperture and fast switching speed; 1D and 2D arrays of modulators (or pixels). These can be addressed using active matrix techniques (for example thin film transistor arrays or more conventional integrated circuit back-planes) where the fast switching speed and high interaction strength are important, or addressed using passive matrix techniques, where the fast switching speed and bistability are important. Focussing upon the 2D arrays, these could be flat panel computer displays. It seems clear that, while active matrix addressing of nematic LC panels can lead to good gray-scale (color) panels, it is very difficult to manufacture the required active matrix back planes.

Recently the difficulty in manufacturing active matrix displays has prompted the flat panel computer display industry to consider an alternative approach to true gray scale, that is spatial averaging or halftone gray scale in much more easily manufactured passively addressed displays to achieve the required quality (Pleshko (1990) Information Display 6:10–11). In this type of application the high contrast, bistability and high resolution of smectic C*LC devices are advantageous over the conventional nematic LC devices. Indeed, the speed of FLCs allows the possibility of additional gray levels in the device by temporal averaging as well as spatial averaging. Even so, with the switching speeds currently possible with FLCs, it is not possible to achieve the number of gray levels and frame rates necessary to create passively addressed full motion, full color video panels.

Smectic A*LC applications: The smectic A*LC modulators provide the same switching speed advantages as smectic C*LC modulators, but give voltage-regulated analog gray scale response instead of bistable 1 bit response. A smectic A*LC would thus be useful in single element and array modulators where true analog gray scale is required. However, improved switching speeds and temperature stability are required. Thus, when the smectic A*LC devices are very fast, the interaction strength is low, when the devices show strong interaction (i.e. high voltage-induced tilt angle), the response speed is slower, and the temperature must be carefully controlled.

Bradshaw et al., International Patent application WO 87/06021 refer to a liquid crystal display arrangement which provides very low minimum light transmission, useful as a shutter and for high contrast digital displays. A single cell device comprising a liquid crystal material having a cholesteric phase above a chiral smectic and also having a large cholesteric pitch is described. It is indicated that these properties of the FLC material are necessary to provide a uniform alignment of the FLC layers in the cell and thus result in cells with improved contrast.

Coulson et al. International Patent application WO 87/06020 refer to devices using ferroelectric smectic liquid crystal materials and to a cell wall surface treatment to give high tilt to contacting liquid crystal molecules. This surface treatment is said to provide improved uniformity of the cells by improving alignment of the FLC molecules in the cell. The application refers to the use of FLC materials having a cholesteric phase at higher temperature to the chiral smectic phase and preferably having a high cholesteric pitch. The surface treatment is said to provide a surface tilt of above 5°. A surface treatment including a process of oblique evaporation of silicon monoxide is specifically described.

Handschy et al. (1987) Optics Lett. 12:611 refer to the use of FLC elements or cells in optical parallel logic gates. The reference describes the "cascading" of two FLC cells to create a logic gate. Each of the SSFLC cells employed had a tilt angle of 22.5° or more.

SUMMARY OF THE INVENTION

Figure 1A:
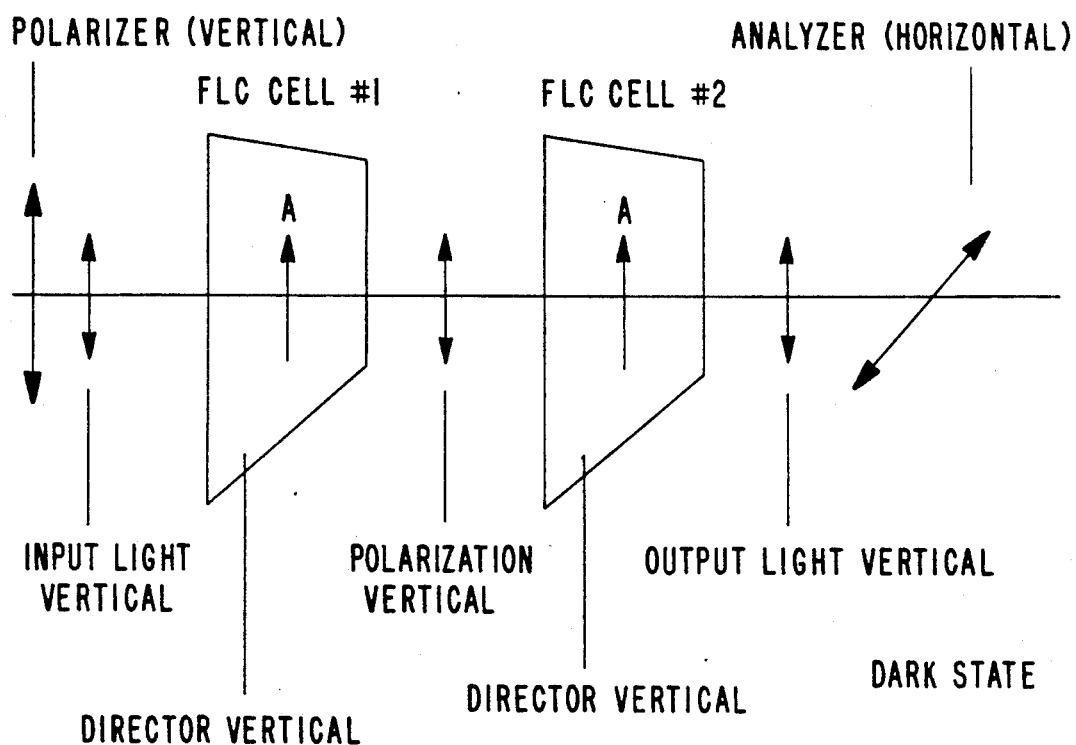
FIG. 1 illustrates an exemplary light valve configuration for a fast response high contrast SSFLC based light valve. In the illustrated device, the tilt angle of the liquid crystal material, $\Theta = 11.25°$ and two SSFLC cells are positioned between crossed polarizers. In this case the dark state is the state in which the SSFLC cells are unswitched and the bright state is that in which the SSFLC cells are switched.

The present invention describes device configurations incorporating chiral smectic liquid crystal-based cells which provide fast response, high contrast light valves and light valves which allow production of multi-stable gray levels. The device configurations of the present invention can in particular employ smectic C* and smectic A* LC materials.

DETAILED DESCRIPTION OF THE INVENTION

Presented herein are approaches for achieving high contrast or multi-stable gray level chiral smectic LC light valves with fast device response times. The approach relies on the combination of two or more chiral smectic LC cells incorporating low tilt, i.e less than about 15°, FLC materials in a bistable FLC cell or smectic A* LC materials which display a field dependent tilt angle, such as in a smectic A* LC cell based on the electroclinic effect. The use of such lower tilt materials generally results in devices with faster response times. The device configurations of the present invention improve the usefulness of both SSFLC and electroclinic effect-based light valves. The invention involves the use of two or more chiral smectic LC cells positioned sequentially along a light path through the device.

In bistable chiral smectic LC cells, each cell has two transmission states and application of an electric field switches between those states. Synchronous switching of all the cells in a device results in two device transmission states. Independent switching of each bistable cell results in $2^n$ device transmission states. The tilt angle of a material in bistable devices may vary as a function of temperature. Clearly, the operating temperature range for a particular chiral smectic LC cell depends on the temperature range over which the LC material remains in the desired smectic phase.

In cells in which the tilt angle, and thus the rotation of the optic axis (ñ), is dependent on the magnitude of the applied electric field, a continuum of transmission states can be obtained dependent on the magnitude of the applied field. A saturation tilt angle is an intrinsic property of a smectic A* LC material that displays the electroclinic effect. Generally, in such devices the tilt angle is linearly dependent on the magnitude of the applied electric field, at tilt angles below the saturation tilt angle. The saturation tilt angle is the maximum tilt angle that can be achieved with a particular material by increasing the magnitude of the electric field. The field-induced tilt angle and the saturation tilt angle of a particular material are also a function of the temperature. Different smectic A* LC materials will display different dependence of tilt angle on temperature. An electroclinic cell can be operated in a pseudo-bistable mode, i.e. switching between two transmission states using a ±E driving field.

A light shutter has two transmission states: a bright state, transmitting incident light and a dark state in which light transmission is minimized. Shutters of the present invention comprise two or more low tilt chiral smectic LC cells positioned along a light path through the shutter. The shutter contains an entrance polarizer which defines the polarization of the light entering the shutter and an exit polarizer or analyzer. The entrance and exit polarizers may be parallel or crossed with respect to each other. The chiral smectic LC cells in the shutters of the present invention are switched synchronously. Two device switching states are defined for convenience: the "OFF" state is defined as the state in which the molecular director, i.e. the direction of the optic axis, usually designated ñ, of the materials in all of the FLC cells in the shutter are either parallel or perpendicular with respect to each other; the "ON" state is defined as that state in which the optic axis of sequential cells along the light path tilt in opposite directions with respect to each other. The FLC cells of the shutter are oriented with respect to each other such that the shutter can be switched between the "ON" and the "OFF" state. Switching between the "ON" and "OFF" states allows switching between the dark and bright states. Alternation of the sign of the tilt direction of the optic axis of LC cells along the light path can be achieved by reversing the sign of the electric field applied to sequential cells. Alternatively, with SSFLC cells, sequential cell can be designed to incorporate chiral smectic LC materials having polarization densities of alternating sign. The sign of polarization of an chiral smectic LC material can be selected by appropriate choice of the chirality.

The optic axis of the chiral smectic LC cells in the "OFF" state must be oriented parallel or perpendicular to the plane of polarization of entering light. When the entrance and exit polarizers are perpendicular (or crossed) with respect to each other, the "OFF" state represents the dark state of the shutter and the "ON" state represents the bright state of the shutter. The bright and dark states are reversed when parallel polarizers are employed.

The FLC cells of the present invention are designed to be half-wave plates over the range of wavelength for which the shutters and light valves are intended to be used. The FLC cell is designed so that $\Delta nd$ is equal to $\lambda/2$. In general, the FLC cell is designed to be a half-wave plate at a wavelength in the middle of the operating wavelength range of the device. For example, for applications in the visible spectrum the FLC cells can be designed such that $$\frac{\Delta nd}{2} = 575 \; nm$$

To achieve highest contrast between the dark and bright state of the shutter, it is most preferable that the sum of the tilt angles (independent of sign) of all the chiral smectic LC cells in the shutter be about 22.5°. This results in a rotation of 90° of the incident light. The sum of the tilt angles of the chiral smectic LC cells in the shutter is preferably at least about 11.25°, but not greater than about 33.75°. Contrast will generally improve as the sum of the tilt angles increases above 11.25° to about 22.5°. It is preferable that the sum of the tilt angles of the cells is 15° or more, but not greater than about 30°. It is more preferable that the sum of the tilt angles of the cell is 20° or more, but not greater than about 25°. In some shutter applications, dependent on the sensitivity of the light detector, it may not be necessary to achieve a full rotation of 90° to attain the highest contrast perceivable by the detector. The sum of the tilt angles of the chiral smectic LC cells of the shutter devices of the present invention can be adapted to achieve a desired detectible level of contrast.

The contrast of a shutter based on chiral smectic LC cells can also be affected by: defects in the alignment of the smectic layers in the cell, deviations of the chiral smectic LC cells from an ideal half-wave plate and device losses such as reflection from surfaces in the shutter. The use of multiple chiral smectic LC cells in the shutters of the present invention can amplify the effect of alignment defects. Thus, it is most preferred that the chiral smectic LC cells employed in the shutters of the present invention be essentially defect-free. Defects can be minimized by uniform alignment of the chiral smectic LC materials in the LC cells. A variety of techniques are known in the art for minimizing such defects, any or all of such techniques are applicable to the construction of the chiral smectic LC cells used in the devices of the present invention. Means are known in the art for choice of design of a chiral smectic LC cell to produce a cell that will function as a half-wave plate over a desired wavelength range and minimizes losses due to non-ideality of the half-wave plate. Means are also known in the art for minimizing device losses.

The shutter of the present invention can employ low tilt bistable chiral smectic LC cells, such as SSFLC cells or electroclinic effect cells, such as soft mode LC cells operated in a pseudo-bistable mode by application of a ±E driving field.

Figure 1B:
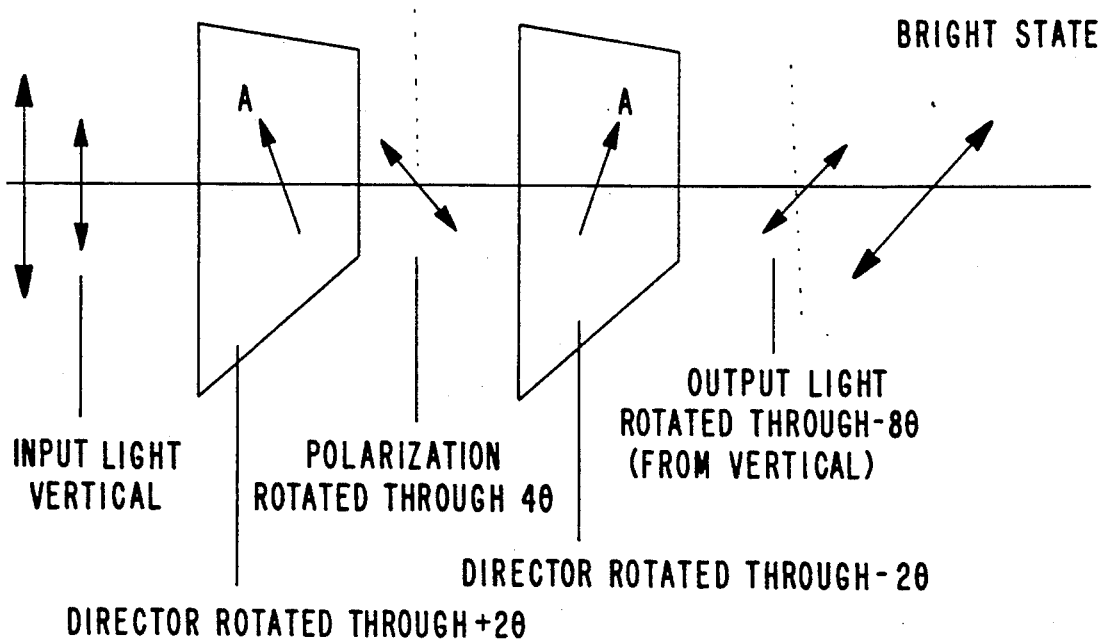

The shutters of the present invention are illustrated, for example, in FIG. 1 for two cells. In this figure, the cells are standard SSFLC cells of half-wave thickness. The cells are driven between the two states (dark and bright) by application of electric fields across each cell. In the illustrated example, the cells are between crossed polarizers such that the dark state is the unswitched state. If parallel polarizers are employed, the dark state is the switched state. If the FLC materials in the cells have the same sign of P, then the driving fields for the two cells must be opposite in sign. If the FLC materials have opposite sign of P, then the driving fields can be of the same sign. The two cells can be "integrated", in the sense that the spacer between can be as thin as possible, or they can be completely independent.

Consider the case where Θ = 11.25°, as indicated in FIG. 1. In the dark state, vertically polarized light passes through the device unchanged, and is extinguished at the analyzer. In the bright state, the optic axis of cell #1 is rotated through 22.5° (2Θ), while the optic axis of cell #2 is rotated through - 22.5°. Vertically polarized input light is rotated through +45° upon passing through cell #1. This is then the polarization angle of the input light for cell #2. Upon passing through cell #2, the light is rotated a total of −67.5° (45°+22.5°) and the light from cell #2 is output at −90° from vertical. This affords the maximum possible transmission through the analyzer, and the maximum contrast possible with the device.

In general, two cells in series cause the output light in the bright state to be rotated through 8Θ. Addition of one more pair of cells in the series affords a rotation of output material having light of 16Θ, and would give optimum contrast for cells containing Θ=5.625°. Since known smectic A materials can readily achieve a voltage regulated tilt angle of on the order of 6° per cell in cells utilizing the electroclinic effect, a shutter device employing, for example, four smectic A* electroclinic cells operating in a pseudo-bistable mode to obtain tilt angles of about 5.6° can be used to obtain a rotation of incident light of about 90°.

Figure 2A:
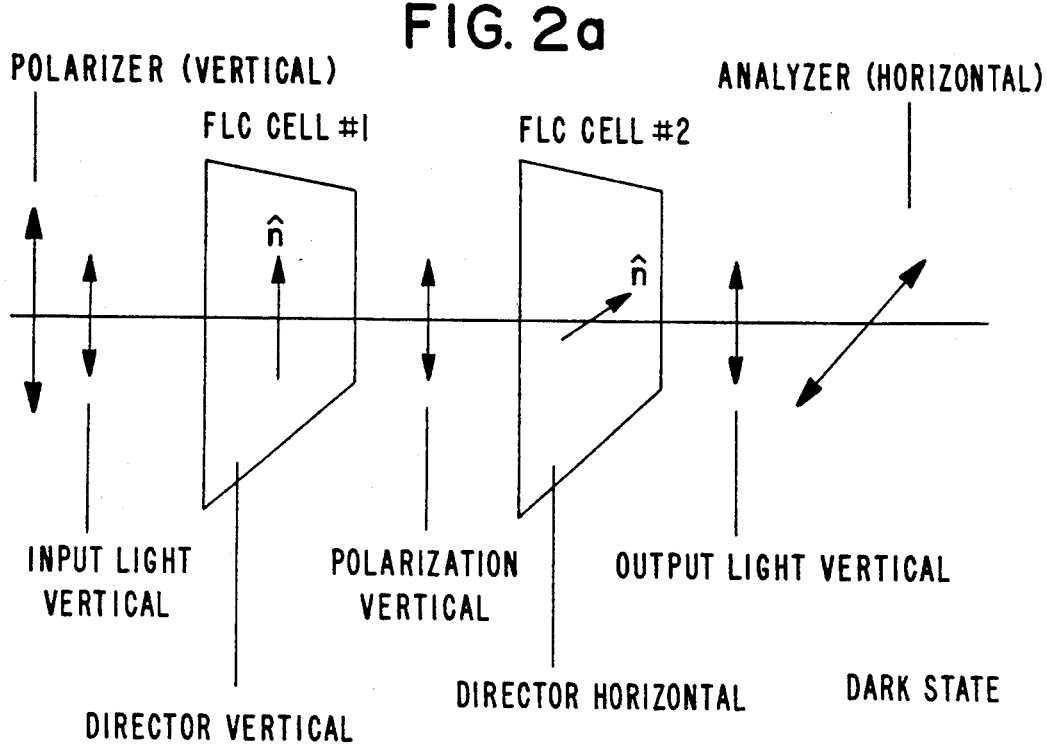
FIG. 2 is an illustration of an exemplary light valve configuration. In this device, two SSFLC cells with $\Theta = 11.25°$ are positioned between crossed polarizers. One of the SSFLC cells is rotated 90° with respect to the other cell. Again the dark state is that in which the SSFLC cells are unswitched and the bright state is that in which the SSFLC cells are switched.
Figure 2B:
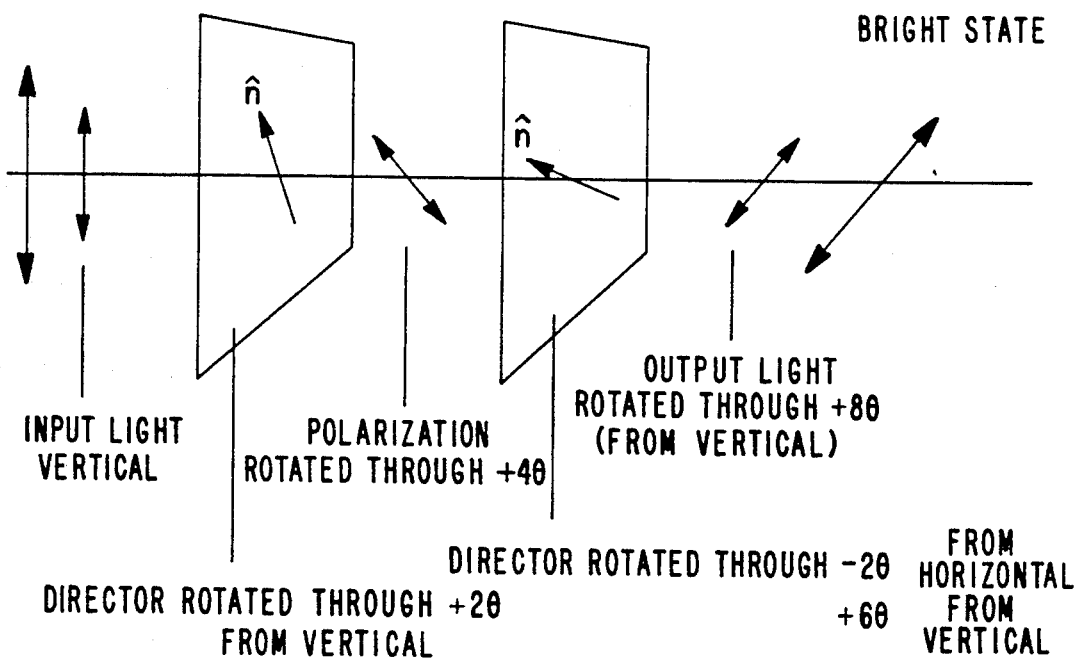

A second example of a light valve configuration is illustrated in FIG. 2. Again, two standard SSFLC cells of half-wave thickness are used. The cells are driven between the two states (dark and bright) by application of electric fields across each cell. In this example, crossed polarizers are employed. If the FLC materials in the cells have the same sign of P, then the driving fields for the two cells must be opposite in sign. If the FLC materials have opposite sign of P, then the driving fields can be of the same sign. In this configuration, the second cell is rotated 90° with respect to the first cell so that the molecular director of the materials in the two cells are perpendicular in one state (the dark state between crossed polarizers) and tilt in opposite directions with respect to their dark state director orientations in the switched state (bright state) of the device. These tilts can be such that the angle between the bright state director orientations of the two cells is acute or obtuse.

Consider the case where Θ=11.25° as indicated in FIG. 2. In the dark state, vertically polarized light passes through both cells unchanged, and is extinguished at the analyzer. In the bright state, the optic axis of cell #1 is rotated through 22.5° (2Θ) from the vertical, while the optic axis of cell #2 is rotated through −22.5° from the horizontal or +67.5° from the vertical. Vertically polarized input light is rotated through +45° upon passing through cell #1. This is then the polarization angle of the input light for cell #2 which is 22.5° from the optic axis of cell #2. Upon passing through cell #2, the light is rotated another +45° and the light from cell #2 is output at 90° from vertical. This affords the maximum possible transmission through the analyzer, and the maximum contrast possible with the device.

This second light valve configuration can also be configured with more than two cells to provide optimum contrast at Θ=90°/4n where n is the number of cells.

As stated above the lower the tilt angle the faster the device response time. In principle a large number of cells having very low tilt angle might be combined to give the fastest response time and a desired sum of tilt angles. However, losses due to alignment defects and device losses can increase with the number of cells employed. The complexity and cost of devices also increase with the number of cells employed. All of these factors must be balanced to achieve a practical shutter device. The number of chiral smectic LC cells in the shutter is preferable less than about ten. The number of chiral smectic LC cells in the shutter is more preferable less than five.

The shutter devices of the present invention have been exemplified by combination of FLC cells having the same tilt angle or voltage regulated tilt angle. This invention includes shutter devices having chiral smectic LC cells with different tilt angles or voltage regulated tilt angles, as long as the sum of the tilt angles is as defined above to achieve a desired high contrast.

Fast response light valves having multi-stable gray levels can be achieved employing design configuration similar to the shutter designs provided herein. In another aspect of the present invention, device geometries for achieving such multistable gray levels employing bistable chiral smectic LC cells or electroclinic effect based cells having voltage regulated tilt angle are provided. The gray level devices of the present invention involve the use of two or more chiral smectic LC cells, each ½ wave thick, in series along a light path through the device. The light valves contain an entrance polarizer and an exit polarizer or analyzer. The polarizers can be parallel or perpendicular with respect to each other. Similar to the shutters of the present invention a device "OFF" state is defined in which the optic axes of all of the chiral smectic LC cells in the device are either parallel or perpendicular with respect to each other. The optic axes of the chiral smectic LC cells of the light valve in the "OFF" state are either parallel or perpendicular to the plane of polarization of light entering the valve as defined by the entrance polarizer. The chiral smectic LC cells in the these light valves are in general not switched synchronously. Each cell is independently addressable, i.e. independently switchable by application of an electric field.

When bistable chiral smectic LC cells or pseudo-bistable cells are employed, $2^n$ (where n is the number of LC cells employed) device states are accessible, including the "OFF" state defined above. All other accessible switching states are defined as "ON" states. When bistable cell are employed at least two independently switchable cells are required to achieve gray levels. The tilt angle of the FLC material in each cell is chosen such that each possible switching combination of cells, i.e. each device "ON" state, affords a different angle of plane polarized output light. One or more chiral smectic LC cells in the device may be switched at the same time to achieve a desired rotation output. The optic axes of sequential LC cells along the light path tilt in opposite directions with respect to each other. Switching between the "OFF" and "ON" states allows selection of between $2^n$ transmission states ranging from bright to dark. These transmission states result from rotation of the incident light in discrete steps (dependent on the choice of tilt angles or voltage regulated tilt angles, the switching scheme employed and the orientation of the polarizers) between 0 and 90°. Such a multi-stable device affords intensity modulation with "digital" gray level output.

If it is desired to achieve maximum contrast between the bright and dark state, i.e. an output rotation of about 90°, the sum of tilt angles in some combination of FLC cells in the device should equal about 22.5°, such that simultaneous switching of that combination of cells results in rotation of the incident light by about 90°. As a practical matter the contrast needed for a particular application depends on the sensitivity of the light detector. As described for the shutters of the present invention, the sum of the tilt angles or voltage regulated tilt angles of the cells in the light valve can be adjusted to achieve a desired level of contrast.

Alternation of the sign of the optic axis of chiral smectic LC cells along the light path can be achieved by reversing the sign of the electric field applied to sequential cells. Alternatively, for SSFLC cells, sequential cells can be designed to incorporate FLC materials having polarization densities of alternating sign. The sign of polarization of an FLC material can be selected by appropriate choice of the chirality.

In order to maintain the fastest response time, it is desirable that the tilt angles of each cell in the light valve is low, i.e. less than about 15°. The tilt angles of the materials in each cell may be the same or different. Although $2^n$ transmission states are accessible in such devices, some of these states may be degenerate, i.e. result in the same output rotation of incident light. Degeneracies of transmission states can be minimized by employing cells having different tilt angles or voltage regulated tilt angles.

An exemplary device of this type is constructed as follows. The device possesses three SSFLC cells oriented in series, and can output light in any of eight possible rotation angles. For the three-cell device, the input plane of polarization is vertical. Each cell in the device can be set to one of two possible states (0 or 1), and the tilt angle of the FLC material in the first cell is 10°, the tilt angle of the material in the second cell is 7.5°, and the tilt angle of the material in the third cell is 5°. Thus, the "cone angle," or difference in director orientation in the 0 and 1 states, for the three cells is 20°, 15°, and 10°, respectively, i.e. 2 times the tilt angle $\Theta$. Finally, the sign of the polarization of the material, or equivalently the signs of the driving fields, are set such that when switched into the "0" state, i.e. the "OFF" state as defined above, each director is vertical, while in the "1" state, the first cell has a +20° director orientation, the second cell has a −15° director orientation, and the third cell has a +10° director orientation. The various combinations of switching states of the three cells represent the "ON" states as defined above. Under these conditions, the eight different output angles obtained for each of the eight possible multistable device states is given in Table 1. The output rotation given in Table 1 is measured with respect to the vertical, i.e. plane of polarization of the incident light.

TABLE 1

Listing of multistable output rotation angles for all eight possible device states for a multi-stable gray scale device employing three bistable SSFLC cells as described above.

| Device State* | Output Rotation Angle (degrees) |
|---|---|
| 0,0,0 | 0 |
| 0,0,1 | 20 |
| 0,1,0 | 30 |
| 1,0,0 | 40 |
| 0,1,1 | 50 |
| 1,0,1 | 60 |
| 1,1,0 | 70 |
| 1,1,1 | 90 |

*The first digit represents the switched state of the first cell, the second digit represents that state of the second cell, etc.

In general, for three cells in the geometry described, if the cone angles for the three cells are x, −y, and z (as defined above), and the state of the first cell is = a (either 0 or 1), the state of the second cell is = b (0, or 1), and the state of the third cell is = c (0, or 1), then the output rotation angle for a given multi-stable state of the device is given by 2(ax+by+cz). Maximum contrast (when the analyzer is set horizontal) between the darkest state (0,0,0) and the brightest state (1,1,1) is achieved when ax+by+cz=45°. In this case degenerate states are avoided, since the tilt angles of the cells employed are all different.

More generally, using a similar approach, for n cells in series, a maximum of $2^n$ output rotation angles are possible.

Similar device configurations can be employed with smectic A* electroclinic cells to provide devices having a voltage regulated gray scale with broad dynamic range. A single electroclinic cell between parallel or crossed polarizers, for example, can provide light intensity modulation. However, the intensity range accessible is narrow, dependent on the saturation tilt angle of the material, generally less than about 15°. Combination of two or more electroclinic cells sequentially along a light path in which the cells are oriented with respect to each other such that in one device state, defined again as the "OFF" state, the direction of the optic axes of all chiral smectic LC cells in the device are either parallel or perpendicular. The plane of polarization of light entering the device is either parallel or perpendicular to the optic axes of the cells in the "OFF" state. A continuum of "ON" states, representing a continuum of transmission states are accessible by regulation of the voltage applied to the cells. In such a device the incident light can be rotated to any angle between 0° and a maximum angle that is equal to four times the sum of the saturation tilt angles of the cells in the device. To achieve maximal contrast by rotation of the incident light by about 90° it is desirable that the sum of the saturation tilt angles of the cells employed in the device be at least about 22.5°.

The present invention has been illustrated by the presentation of a number of specific embodiments. It is not intended that the scope of the scope of the invention be limited to those embodiments and devices specifically described. For example, the design configurations of the present invention can be readily adapted for use in the reflective mode. It will be readily apparent to those of ordinary skill in the art how to adapt the devices of the present invention to use in the reflective mode. For example, it may be appropriate to employ a reflective surface on one of the plates of the chiral smectic LC cell to allow reflection of light to a sequential cell. In such a case, it may be appropriate to employ a chiral smectic LC cell that is a quarter-wave plate at the desired wavelength.

We claim:

1. A light valve which is switchable, by application of an electric field, between a first and a second transmission state which comprises two or more chiral smectic liquid crystal cells aligned sequentially along a light path through said valve, said cells positioned between an entrance polarizer which defines the plane of polarization of light entering said valve and an exit polarizer, said cells being synchronously switchable between said transmission states, wherein said cells are half-wave plates, wherein said cells are oriented with respect to each other such that in said first transmission state the optic axes of all said cells are either parallel or perpendicular to each other and are either parallel or perpendicular to the plane of polarization of light entering said valve and in said second transmission state the optic axes of sequential cells along the light path through said light valve rotate in opposite directions and wherein switching between said two transmission states results in switching between a dark and a bright transmission state.

2. The light valve of claim 1 in which said chiral smectic liquid crystal cells are SSFLC cells.

3. The light valve of claim 1 in which said chiral smectic liquid crystal cells are electroclinic-effect based cells.

4. The light valve of claim 3 wherein the magnitude of the applied electric field to said electroclinic-effect based cells for switching to said second transmission state is that which si required to attain a tilt angle of 90°/4n wherein n is the number of cells in said light valve and wherein said tilt angle is the tilt angle of each of the individual cells contained in said light valve.

5. The light valve of claim 3 in which said electroclinic-effect based cells are operated in a pseudo-bistable mode.

6. The light valve of claim 5 in which said electroclinic-effect based cells contain smectic A liquid crystal materials.

7. The light valve of claim 1 which contains two SSFLC cells wherein said tilt angle of each of said cells is about 22.5°/2.

8. The light valve of claim 1 which contains four SSFLC cells wherein said tilt angle of each of said cells is about 22.5°/4.

9. The light valve of claim 1 wherein the chiral smectic liquid crystal materials of sequential cells along the light path through said valve have opposite signs of polarization density.

10. The light valve of claim 1 wherein the sign of polarization of the chiral smectic liquid crystal materials in each cell is the same and wherein the electric field applied to said sequential liquid crystal cells along said light path alternates in sign.

11. The light valve of claim 1 wherein, in said first transmission state, the optic axes of said cells are parallel with respect to each other.

12. The light valve of claim 1 wherein, in said first transmission state, the optic axes of said cells are perpendicular with respect to each other.

13. A multistable gray-scale light valve which comprises two or more chiral smectic liquid crystal cells aligned along a light path through said valve between crossed or parallel polarizers, each of said cells being independently switchable between a switched and an unswitched sate by application of an electric field, wherein said cells are oriented with respect to each other such that, in the unswitched state, the optic axes of said cells are either parallel or perpendicular and, in the switched state, the optic axes of sequential cells along said light path through said light valve rotate in opposite directions on said application of an electric field, wherein the sum of the tilt angels of said cells is 22.5° and wherein independent switching of said cells results in selection of device transmission states each of which device transmission states results in an output light polarization rotated by a given angle between about 0° and about 90° from the polarization of light entering said valve.

14. The multistable gray-scale light valve of claim 13 wherein the tilt angles of the chiral smectic liquid crystal cells in said light valve are continuous variable between about 1° and about 11.25° by application of a variable electric field.

15. The multistable gray-scale light valve of claim 14 which contains two electroclinic effect-based ferroelectric liquid crystal cells the rotation of the optic axes of each of said cells being continuously variable from about 1° to about 11.25°.

16. The multistable gray-scale light valve of claim 13 which contains three SSFLC cells.

17. The multistable gray-scale light valve of claim 13 which contains four SSFLC cells.

18. The multistable gray-scale light valve of claim 13 in which said cells are electroclinic-effect based cells.

19. The multiple gray-scale light valve of claim 18 wherein said electroclinic-effect based cells contain smectic A liquid crystal materials.

* * * * *

UNITED STATES PATENT AND TRADEMARK OFFICE
CERTIFICATE OF CORRECTION

PATENT NO. : 5,168,381
DATED : Dec. 1, 1992
INVENTOR(S) : David M. Walba

It is certified that error appears in the above-indentified patent and that said Letters Patent is hereby corrected as shown below:

Column 2, line 31, please rewrite "Phys. L. Rev." as --Phys. Rev.--.

Column 10, line 31, please delete "of the scope".

Column 11, line 7, please rewrite "si" as --is--.

Column 12, line 6, please rewrite "sate" as --state--; and
line 22, please rewrite "continuous" as --continuously--.

Signed and Sealed this

Eleventh Day of January, 1994

Attest:

BRUCE LEHMAN

Attesting Officer

Commissioner of Patents and Trademarks